US012679370B2

(12) United States Patent (10) Patent No.: US 12,679,370 B2
Oyagi et al. (45) Date of Patent: Jul. 14, 2026

(54) CONTROL DEVICE AND INFORMATION PROCESSING SYSTEM

(71) Applicant: TOYOTA JIDOSHA KABUSHIKI KAISHA, Toyota (JP)

(72) Inventors: Hiroshi Oyagi, Kyoto (JP); Hirokazu Ito, Sunto-gun (JP); Shinya Shiratori, Susono (JP); Norimi Asahara, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/240,538

(22) Filed: Aug. 31, 2023

(65) Prior Publication Data
US 2024/0140433 A1 May 2, 2024

(30) Foreign Application Priority Data

Oct. 31, 2022 (JP) ................................. 2022174894

(51) Int. Cl.
*B60W 30/18* (2012.01)
*B60W 50/14* (2020.01)
*G08G 1/01* (2006.01)
*G08G 1/16* (2006.01)

(52) U.S. Cl.
CPC ....... *B60W 30/18163* (2013.01); *G08G 1/167* (2013.01); *B60W 2756/10* (2020.02)

(58) Field of Classification Search
CPC ....... B60W 30/18163; B60W 2756/10; B60W 2050/143; B60W 2050/146; B60W 2556/45; B60W 50/14; G08G 1/167; G08G 1/0112; G08G 1/0133
USPC .......................................................... 701/26
See application file for complete search history.

(56) References Cited

U.S. PATENT DOCUMENTS

| | | | |
|---|---|---|---|
| 2005/0015203 A1 | 1/2005 | Nishira | |
| 2018/0297586 A1* | 10/2018 | Kim | A61B 3/112 |
| 2020/0202108 A1* | 6/2020 | Matsuo | G06V 40/174 |
| 2020/0286387 A1* | 9/2020 | Zhou | G08G 1/0175 |
| 2020/0361461 A1* | 11/2020 | Eo | B60K 6/387 |

FOREIGN PATENT DOCUMENTS

| | | | | |
|---|---|---|---|---|
| JP | 2005038325 A | 2/2005 | | |
| JP | 2020-101869 A | 7/2020 | | |
| JP | 7262662 B2 * | 4/2023 | | G01C 21/26 |

* cited by examiner

*Primary Examiner* — Hossam M Abd El Latif
(74) *Attorney, Agent, or Firm* — Dinsmore & Shohl LLP

(57) ABSTRACT

A control device includes: a control unit that controls a vehicle. Further, the control unit determines, when the vehicle travels in a section including a plurality of lanes, whether a negative emotion associated with a lane change is detected in a preceding vehicle on a same lane as the vehicle, and causes, in a case of determining that the negative emotion is detected, a notification device of the vehicle to give notification of instruction information giving an instruction for the lane change.

3 Claims, 7 Drawing Sheets

CONTROL DEVICE AND INFORMATION PROCESSING SYSTEM

CROSS-REFERENCE TO RELATED APPLICATION(S)

The present application claims priority to and incorporates by reference the entire contents of Japanese Patent Application No. 2022-174894 filed in Japan on Oct. 31, 2022.

BACKGROUND

The present disclosure relates to a control device and an information processing system.

Japanese Laid-open Patent Publication No. 2005-038325 discloses a control device that assists driving of a vehicle. This control device presents information for assisting a lane change of an own vehicle to a driver in consideration of a case where the own vehicle cannot continue to stay in a current lane.

SUMMARY

There is a need for providing a control device and an information processing system causing a vehicle, when the vehicle travels in a section including a plurality of lanes, to travel on an appropriate lane in advance according to a situation on the lanes.

According to an embodiment, a control device includes a control unit that controls a vehicle. Further, the control unit determines, when the vehicle travels in a section including a plurality of lanes, whether a negative emotion associated with a lane change is detected in a preceding vehicle on a same lane as the vehicle, and causes, in a case of determining that the negative emotion is detected, a notification device of the vehicle to give notification of instruction information giving an instruction for the lane change.

According to an embodiment, an information processing system includes control devices mounted on respective vehicles; and a server communicating with the vehicles. Further, the server determines, on a basis of information received from the vehicles traveling in a section including a plurality of lanes, whether a negative emotion associated with a lane change is detected from a predetermined vehicle in the section, and transmits, in a case of determining that the negative emotion is detected, instruction information giving an instruction for a lane change to a following vehicle on a same lane as the predetermined vehicle, and the control device causes, in a case of receiving the instruction information, a notification device of the vehicle to give notification of the instruction information.

DETAILED DESCRIPTION

With respect to the configuration described in Japanese Laid-open Patent Publication No. 2005-038325, it is conceivable to assist a lane change of an own vehicle by using, for example, a learned model created by machine learning. However, in the configuration described in Japanese Laid-open Patent Publication No. 2005-038325, there is a possibility that an instruction for a lane change according to a road situation cannot be issued and a driver is forced to change a lane at the last minute.

Hereinafter, a control device and an information processing system according to an embodiment of the present disclosure will be specifically described. Note that the present disclosure is not limited to the embodiment described in the following.

Figure 1:
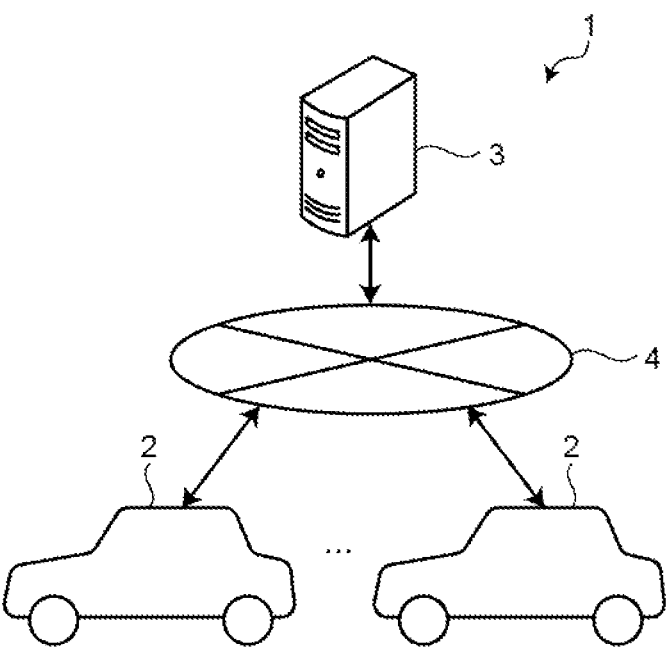
FIG. 1 is a schematic diagram illustrating an information processing system according to an embodiment.

FIG. 1 is a view schematically illustrating an information processing system according to the embodiment. An information processing system 1 is a system in which a plurality of vehicles 2 and a server 3 are communicably connected via a network 4. The vehicles 2 transmit information related to a driving situation to the server 3. The server 3 transmits, to the vehicles 2, information of assisting driving of the vehicles 2 by using the information received from the vehicles 2.

Figure 2:
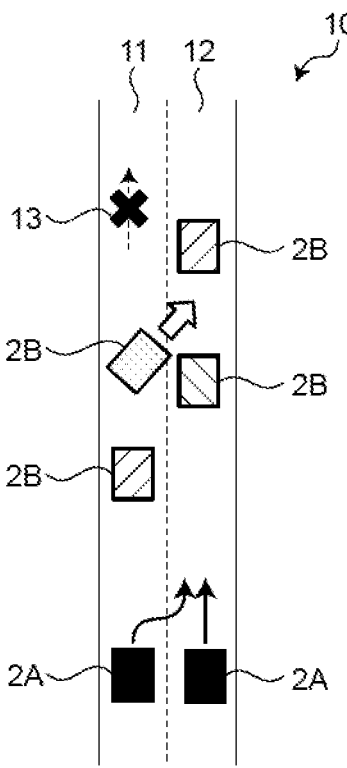
FIG. 2 is a view illustrating a state in which a plurality of vehicles travels on a road having two lanes on each side.

In the information processing system 1, as illustrated in FIG. 2, under a situation where a plurality of vehicles 2 travels on a road 10 having a plurality of lanes, the server 3 provides information to the vehicles 2. The road 10 has a roadway having two lanes on each side, the lanes being a first lane 11 and a second lane 12. The first lane 11 is a lane on a left side in a traveling direction. The second lane 12 is a lane on a right side in the traveling direction. In a case where the plurality of vehicles 2 travels on the road 10, a plurality of front vehicles 2B is present ahead of an own vehicle 2A. Note that the own vehicle 2A and the front vehicles 2B will be simply referred to as the vehicles 2 in a case where a distinction thereof is not specifically necessary. The vehicles 2 include the own vehicle 2A and the front vehicles 2B.

Figure 3:
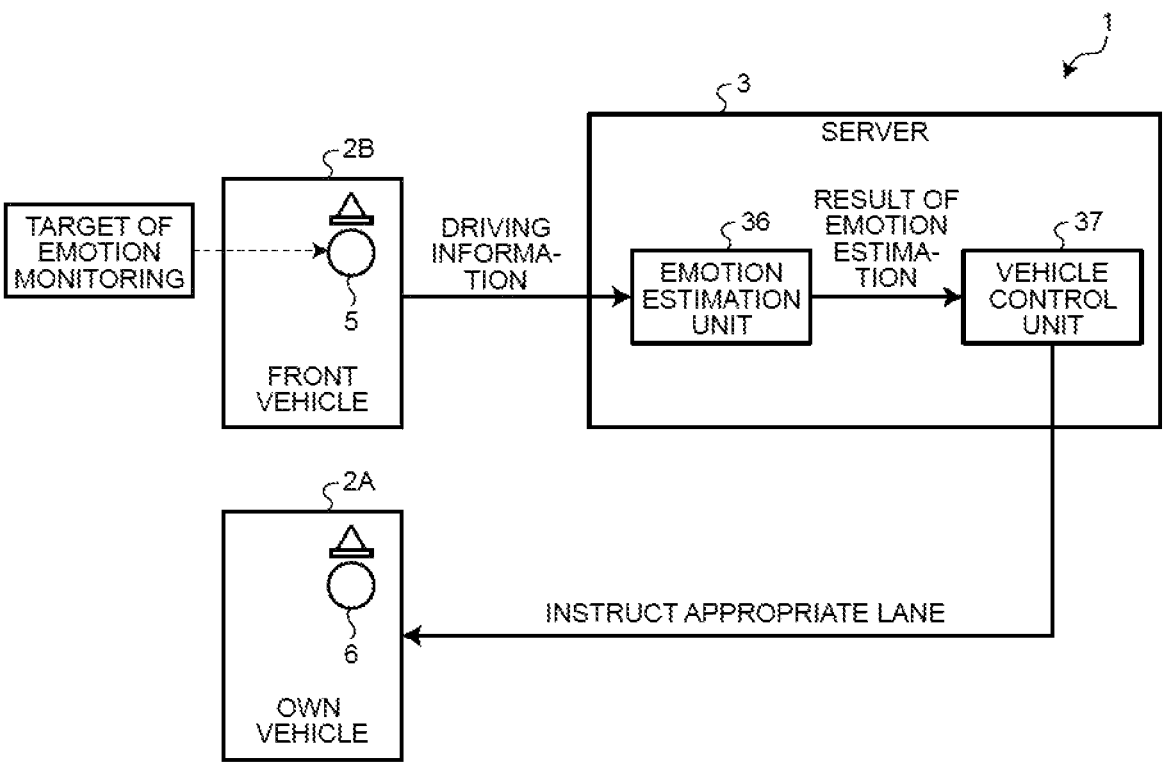
FIG. 3 is a view for describing a flow of estimating a negative emotion of a driver.

As illustrated in FIG. 2 and FIG. 3, the information processing system 1 estimates a negative emotion with respect to the front vehicles 2B located ahead of the own vehicle 2A in a section including a plurality of lanes. The negative emotion is an emotion of drivers of the vehicles 2. The negative emotion is, for example, excitement, fear, anger, surprise, or the like. The drivers 5 in the front vehicles 2B are targets whose emotions are monitored and whose negative emotions are estimated. The server 3 estimates the emotions of the drivers 5 on the basis of information transmitted from the front vehicles 2B. The information processing system 1 estimates the negative emotions of the drivers 5 by using an estimation model generated by machine learning.

Then, the server 3 transmits driving assistance information to the own vehicle 2A according to an estimation result of the emotions with respect to the front vehicles 2B. In a case where the negative emotion associated with a lane change is estimated from the front vehicle 2B traveling ahead of the own vehicle 2A, information giving an instruction for an appropriate lane is output to the own vehicle 2A located behind a point where the negative emotion is estimated. In a case where the own vehicle 2A is traveling on the appropriate lane, instruction information for keeping the lane is output from the server 3 to the own vehicle 2A. In a case where the own vehicle 2A is not traveling in the appropriate lane, instruction information giving an instruction for a lane change is output from the server 3 to the own vehicle 2A. The own vehicle 2A notifies a driver 6 of the own vehicle 2A of the instruction information. Note that in FIG. 2, the own vehicle 2A traveling on the first lane 11 and the own vehicle 2A traveling on the second lane 12 are illustrated together for convenience of description.

Figure 4:
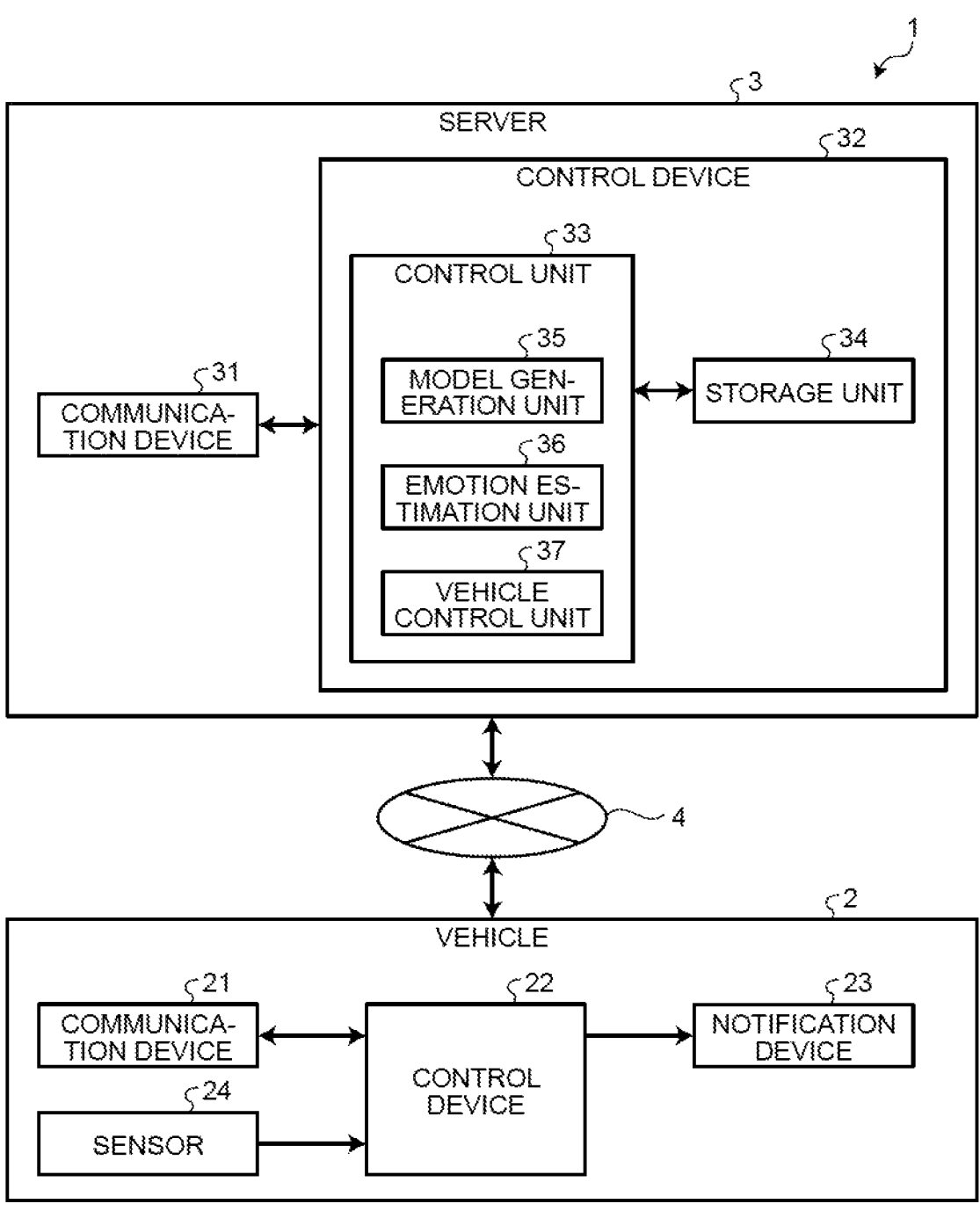
FIG. 4 is a block diagram for describing an information processing system.

FIG. 4 is a block diagram schematically illustrating the information processing system. The information processing system 1 includes the vehicles 2 and the server 3.

Each of the vehicles 2 includes a communication device 21, a control device 22, a notification device 23, and a sensor 24.

The communication device 21 performs wireless communication with an external device. The communication device 21 transmits and receives information to and from the server 3 via the network 4.

The control device 22 is an electronic control device that controls the vehicle 2. The electronic control device includes a processor and a memory (main storage unit). The processor includes a central processing unit (CPU), a digital signal processor (DSP), a field-programmable gate array (FPGA), a graphics processing unit (GPU), and the like. The memory includes a random access memory (RAM), a read only memory (ROM), and the like. The control device 22 is an in-vehicle device mounted on the vehicle 2.

Signals from various sensors mounted on the vehicle 2 are input to the control device 22. A signal from the sensor 24 is input to the control device 22. The sensor 24 includes a sensor that detects a current position of the vehicle 2, a sensor that detects a lane on which the vehicle 2 is traveling, a sensor that detects a vehicle speed of the vehicle 2, a sensor that detects operation of a direction indicator of the vehicle 2, a sensor that detects a heart rate of the driver of the vehicle 2, and the like. That is, the sensor 24 includes a receiver of a GPS signal and a sensor that detects a lane change request during traveling. Furthermore, the sensor that detects the heart rate of the driver includes, for example, an in-vehicle camera that images an interior of the vehicle 2. The in-vehicle camera can measure the heart rate of the driver by imaging the driver of the vehicle 2. The sensor 24 outputs information related to the heart rate of the driver to the control device 22. Then, the control device 22 executes vehicle control on the basis of signals input from the various sensors. The vehicle control includes communication control of transmitting driving information indicating a driving situation of the vehicle 2 to the server 3, and notification control of notifying the driver of the driving assistance information provided from the server 3. The driving information includes information indicating that the vehicle 2 requests a lane change, information indicating a direction of the lane change, information indicating the heart rate of the driver, and information indicating the vehicle speed of the vehicle 2.

The notification device 23 notifies the driver of the vehicle 2 of the driving assistance information. The driving assistance information includes instruction information giving an instruction for an appropriate lane. The notification device 23 is a human machine interface (HMI) such as a speaker or a display device. When the control device 22 executes the notification control, the notification device 23 outputs the instruction information by voice or displays an image with characters of the instruction information. The driver 6 of the own vehicle 2A can change the lane at safe timing on the basis of the instruction information the notification of which is given.

The server 3 includes a communication device 31 and a control device 32.

The communication device 31 performs wireless communication with the vehicle 2. The communication device 31 transmits and receives information to and from the vehicle 2 via the network 4.

The control device 32 is an electronic control device that executes information processing. The control device 32 executes vehicle control of controlling the vehicle 2. The vehicle control includes estimation control of estimating the negative emotion of the driver 5 of the front vehicle 2B and notification control of giving an instruction for a lane to the own vehicle 2A traveling behind the front vehicle 2B.

The control device 32 includes a control unit 33 and a storage unit 34.

The control unit 33 estimates the emotion of the driver by using the information received from the vehicle 2 and provides the vehicle 2 with information assisting driving of the vehicle 2. By using the estimation model, the control unit 33 estimates whether the driver 5 has the negative emotion. The estimation model is a learned model generated by the machine learning. When the control unit 33 estimates the negative emotion of the driver 5 by using the estimation model, biological information of the driver 5 is used as the driving information of the vehicle 2. The biological information includes the information indicating the heart rate.

The control unit 33 includes a model generation unit 35, an emotion estimation unit 36, and a vehicle control unit 37.

The model generation unit 35 generates the estimation model by the machine learning. The estimation model is a model that estimates the negative emotion of the driver 5 and is a learned model learned by the machine learning.

For example, the model generation unit 35 generates the estimation model by supervised machine learning. In the supervised machine learning, a set of the driving information of the vehicle 2, which information is acquired in the past, and information indicating that the driver 5 has the negative emotion is used as training data. Input data in the training data is the driving information of the vehicle 2. Output data in the training data is information indicating that the driver 5 has the negative emotion. The information indicating that the driver 5 has the negative emotion is information indicating the negative emotion set in advance.

As an example, the input data includes information that includes information indicating that the lane change is requested and information indicating that the heart rate is higher than a predetermined value, and the output data is the information indicating that the driver 5 has the negative emotion. The model generation unit 35 previously determines a condition for determining that the emotion of the driver 5 is the negative emotion, and performs the machine learning by using, as the input data, training data satisfying the condition. In other words, the model generation unit 35 previously determines a condition under which it is determined that the emotion of the driver 5 is in a normal state, and performs the machine learning by using, as the input data, training data satisfying the condition. Then, the model generation unit 35 stores the generated estimation model in the storage unit 34.

The emotion estimation unit 36 estimates the negative emotion of the driver 5 in the front vehicle 2B by using the driving information acquired from the traveling front vehicle 2B and the estimation model generated in advance. The emotion estimation unit 36 acquires the estimation model with reference to the storage unit 34. The emotion estimation unit 36 determines whether the heart rate of the driver 5 is higher than the predetermined value. In a case where the heart rate is higher than the predetermined value, it is determined that the emotion is negative. In a case where the heart rate is lower than the predetermined value, it is determined that the emotion is positive.

As illustrated in FIG. 3, the emotion estimation unit 36 outputs an estimation result to the vehicle control unit 37. The estimation result by the emotion estimation unit 36 includes a result indicating that the emotion of the driver 5 is the positive emotion and a result indicating that the emotion of the driver 5 is the negative emotion.

According to the estimation result of the emotion, the vehicle control unit 37 generates the driving assistance information for the own vehicle 2A traveling behind the front vehicle 2B. The vehicle control unit 37 generates, as the driving assistance information, instruction information giving an instruction for a lane. This instruction information includes instruction information instructing the own vehicle 2A to change the lane and instruction information instructing the own vehicle 2A to keep the lane. Then, the vehicle control unit 37 transmits the instruction information giving an instruction for an appropriate lane to the own vehicle 2A. The instruction information transmitted to the own vehicle 2A includes any one of the instruction information instructing the own vehicle 2A to change the lane or the instruction information instructing the own vehicle 2A to keep the lane.

The storage unit 34 includes recording media such as an erasable programmable ROM (EPROM), a hard disk drive (HDD), and removable media. As the removable media, there are a universal serial bus (USB) memory, and disc recording media such as a compact disc (CD), a digital versatile disc (DVD), and a Blu-ray (registered trademark) disc (BD). The storage unit 34 can store an operating system (OS), various programs, various tables, various databases, and the like.

Furthermore, the storage unit 34 may store the estimation result in the emotion estimation unit 36, or may store the driving information or the like received from the vehicle 2.

Figure 5:
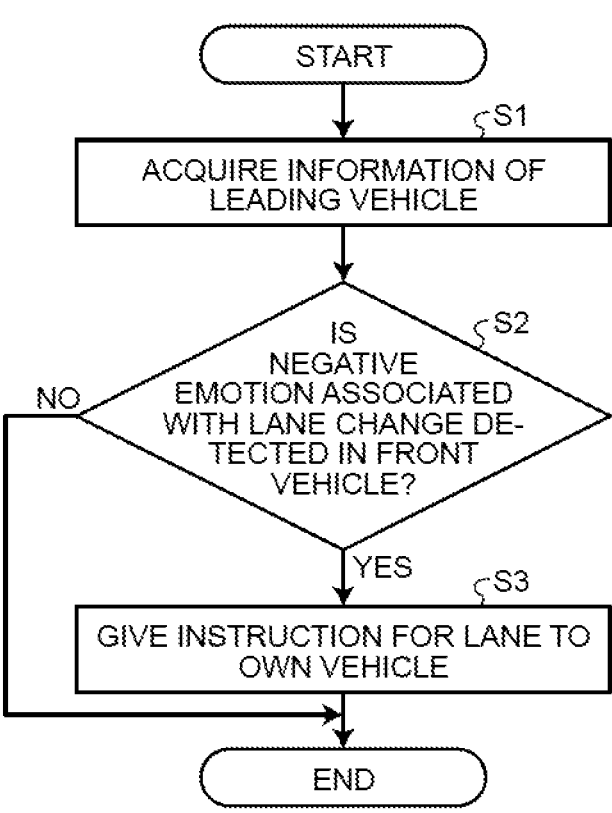
FIG. 5 is a flowchart illustrating a vehicle control flow.

FIG. 5 is a flowchart illustrating a control flow. The control illustrated in FIG. 5 is repeatedly executed by the server 3.

The server 3 acquires driving information of the front vehicle 2B (Step S1). In the processing of Step S1, the driving information indicating a current state of the vehicle 2 is acquired.

The server 3 determines whether the negative emotion associated with the lane change in the front vehicle 2B is detected (Step S2). In Step S2, the negative emotion of the driver 5 is estimated on the basis of the driving information acquired in Step S1 and the estimation model generated in advance.

In a case where it is determined that the negative emotion associated with the lane change in the front vehicle 2B is not detected (Step S2: No), this control routine ends.

In a case where it is determined that the negative emotion associated with the lane change in the front vehicle 2B is detected (Step S2: Yes), the server 3 transmits the instruction information instructing the vehicle traveling behind the front vehicle 2B to change the lane (Step S3). In Step S3, the vehicle 2 receives the instruction information transmitted from the server 3. The control device 22 of the vehicle 2 causes the notification device 23 to give notification of the instruction information giving the instruction for the lane change. This control routine is ended when the processing of Step S3 is performed.

Figure 6:
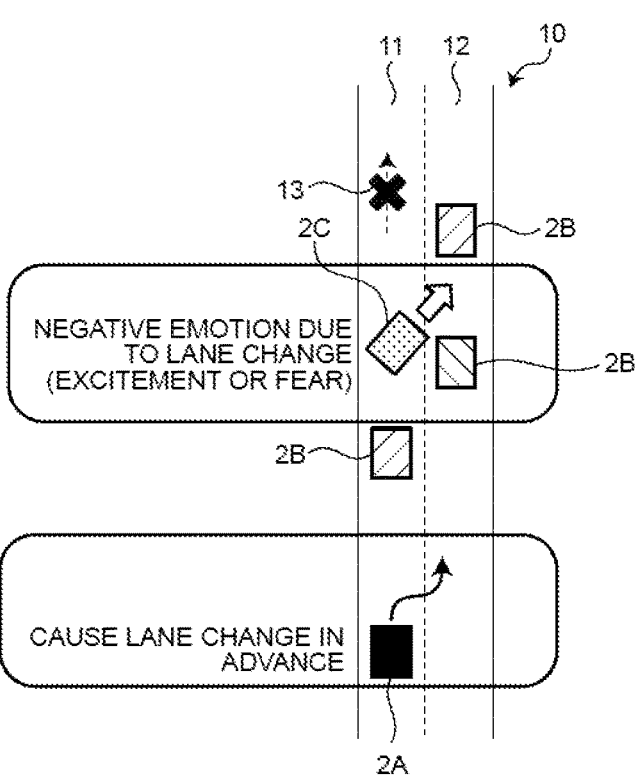
FIG. 6 is a schematic diagram for describing an example of a case where a negative emotion due to a lane change is detected from a preceding vehicle in the same lane as an own vehicle.

As illustrated in FIG. 6, in a case where it is estimated that the negative emotion due to the lane change is detected from a preceding vehicle 2C on the same lane as the own vehicle 2A, the own vehicle 2A traveling on the same lane is notified of the lane change instruction.

As described above, according to the embodiment, in a case where it is estimated that the driver 5 of the front vehicle 2B traveling ahead of the own vehicle 2A has the negative emotion, the driver 6 of the own vehicle 2A is notified of appropriate lane information. As a result, the driver 6 of the own vehicle 2A can select an appropriate lane in advance. Thus, it is possible to reduce a sudden lane change or interruption.

Note that the sensor that detects the heart rate of the driver is not limited to the in-vehicle camera, and is not limited to the sensor mounted on the vehicle 2. For example, the heart rate may be measured by a wearable terminal worn by the driver of the vehicle 2. The communication device 21 can wirelessly communicate with the wearable terminal. The control device 22 can acquire information indicating the heart rate of the driver from the wearable terminal worn by the driver.

Furthermore, the emotion estimation unit 36 may estimate the negative emotion without using the information indicating the heart rate of the driver. For example, in a case where a sudden lane change is performed during driving at a high vehicle speed, it can be estimated that the driver is in an excited state as the negative emotion. Thus, the emotion estimation unit 36 estimates the negative emotion of the driver on the basis of a vehicle speed of the front vehicle 2B, an inter-vehicle distance between the front vehicle 2B and surrounding vehicles, and the lane change request. That is, the model generation unit 35 performs the machine learning by using, as the input data of the training data, the vehicle speed, the inter-vehicle distance, and the information indicating that there is the lane change request. In this case, not only the inter-vehicle distance but also a steering angle of the front vehicle 2B may be used. That is, the sensor 24 includes a sensor that detects an inter-vehicle distance between the front vehicle 2B and the surrounding vehicles, and a sensor that detects the steering angle of the vehicle 2. Furthermore, the driving information may include the information indicating the inter-vehicle distance and the information indicating the steering angle.

Furthermore, the vehicle control unit 37 may transmit the instruction information giving the instruction for the lane change to the following vehicle in a case where a certain number or more of the negative emotions associated with the lane change are detected.

In addition, when causing the notification device 23 to give notification of the instruction information giving the instruction for the lane change, the control device 22 may cause notification of the instruction information giving the instruction for the lane change in the same direction as a direction, in which the preceding vehicle requests the lane change, to be given. That is, the vehicle control unit 37 may generate the instruction information giving the instruction for the lane change in the same direction as the preceding vehicle 2C. The server 3 may transmit, to the following vehicle on the same lane as the preceding vehicle 2C, the instruction information giving the instruction for the lane change in the same direction as the direction in which the preceding vehicle 2C requests the lane change.

Figure 7:
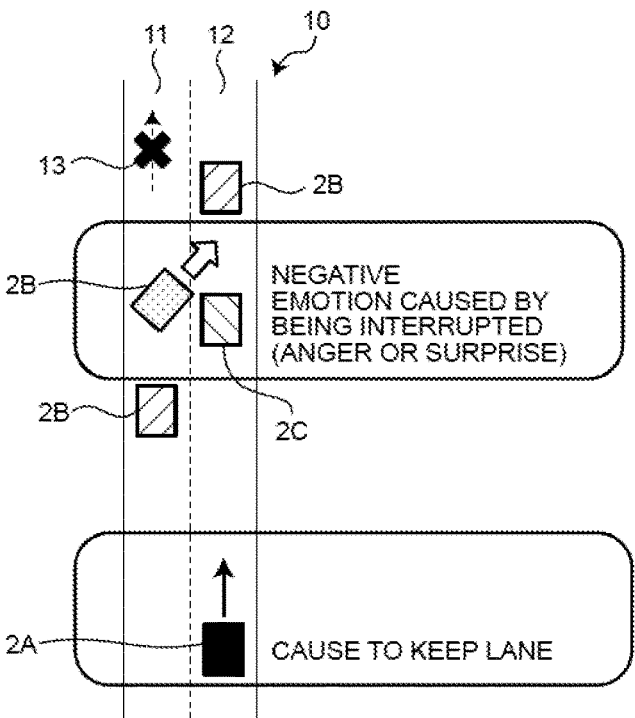
FIG. 7 is a schematic diagram for describing an example of a case where a negative emotion caused by interruption is detected from a preceding vehicle on the same lane as the own vehicle.

Furthermore, as a modification example of the information processing system 1, the emotion estimation unit 36 may estimate a negative emotion of a driver in a vehicle 2 on an interrupted side. As illustrated in FIG. 7, when there is an on-road obstacle 13 on a first lane 11, a negative emotion caused due to interruption in a preceding vehicle 2C on a second lane 12 on which an own vehicle 2A is traveling is detected. This negative emotion is anger or surprise. In this case, since the own vehicle 2A is already present on the second lane 12 which is an appropriate lane, a server 3 transmits instruction information indicating to keep the lane to the own vehicle 2A. A notification device 23 of the own vehicle 2A notifies a driver 6 of the instruction information to keep the lane.

In addition, the vehicles 2 can communicate not only with the server 3 but also with each other. The own vehicle 2A can communicate with a front vehicle 2B (vehicle-to-vehicle communication). The own vehicle 2A can detect a negative emotion of a driver in the front vehicle 2B by the vehicle-to-vehicle communication. In this case, a control device 22 of the front vehicle 2B includes an emotion estimation unit and a vehicle control unit. Specifically, the control device 22 does not transmit driving information to the server 3. The control device 22 acquires an estimation model from the server 3 by communication with the server 3. The emotion estimation unit of the control device 22 estimates the negative emotion of the driver 5 by using the estimation model acquired from the server 3 and driving information acquired by a sensor 24. In a case of detecting the negative emotion of the driver, the vehicle control unit of the control device 22 transmits instruction information that instructs a lane to the following vehicle. The own vehicle 2A causes the notification device 23 to give notification of the instruction information received from the front vehicle 2B.

Furthermore, the on-road obstacle 13 includes a vehicle parked on a road, a fallen object, construction, a broken-down vehicle, and the like. Note that the vehicle parked on a street is limited to the first lane 11.

Figure 8:
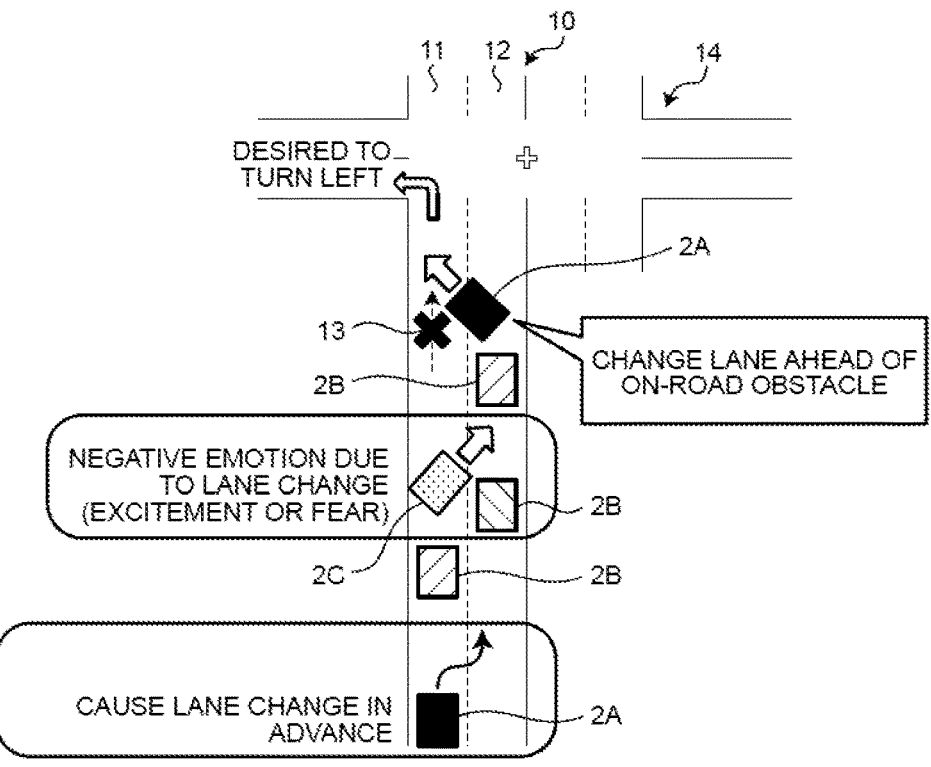
FIG. 8 is a schematic diagram for describing an example of a case where an on-road obstacle is present in front of an intersection.
Figure 9:
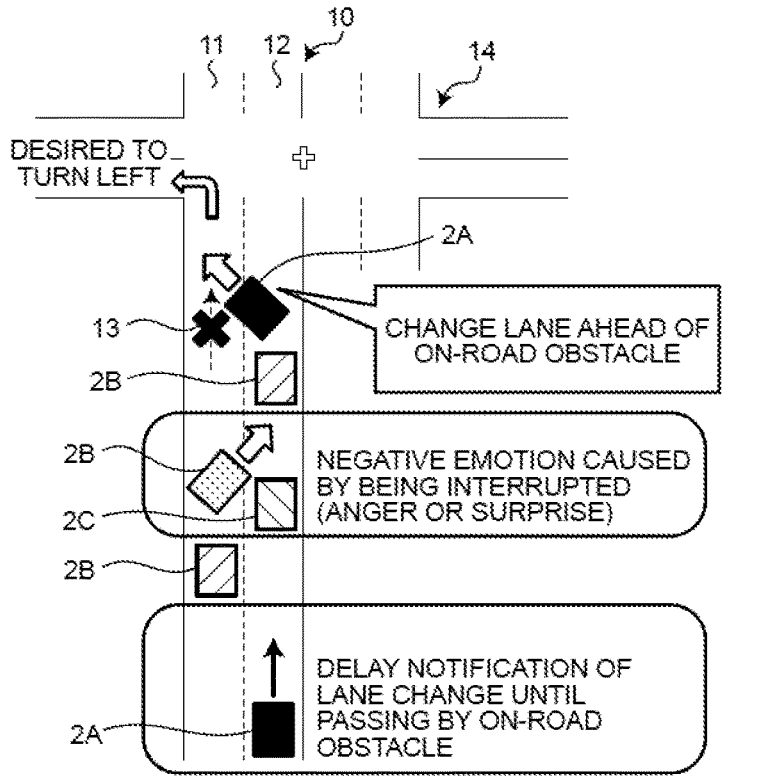
FIG. 9 is a schematic diagram for describing another example of a case where the on-road obstacle is present in front of the intersection.

In addition, in a case where a route to a destination is set, the instruction information may be generated in consideration of a direction in which the own vehicle 2A desires to travel. For example, as illustrated in FIG. 8, in a case where the own vehicle 2A desires to turn left at an intersection 14 ahead of the on-road obstacle 13 present on the first lane 11, the driver 6 of the own vehicle 2A can change the lane to the second lane 12 in advance since the instruction information for the lane change is transmitted to the own vehicle 2A on the first lane 11. Then, the driver 6 of the own vehicle 2A can change the lane to the first lane 11 ahead of the on-road obstacle 13. On the other hand, as illustrated in FIG. 9, in a case of traveling on the second lane 12, the own vehicle 2A is notified of the instruction information to delay the lane change to the first lane 11 until the own vehicle 2A passes by the on-road obstacle 13. As a result, it is possible to prevent the vehicle from performing the lane change from the second lane 12 to the first lane 11 to turn left at the intersection 14 and returning to the second lane 12 again to avoid the on-road obstacle 13 on the first lane 11. Thus, it is possible to reduce the number of lane changes. Note that this control is not limited to route guidance, and may be performed in automatic driving.

Figure 10:
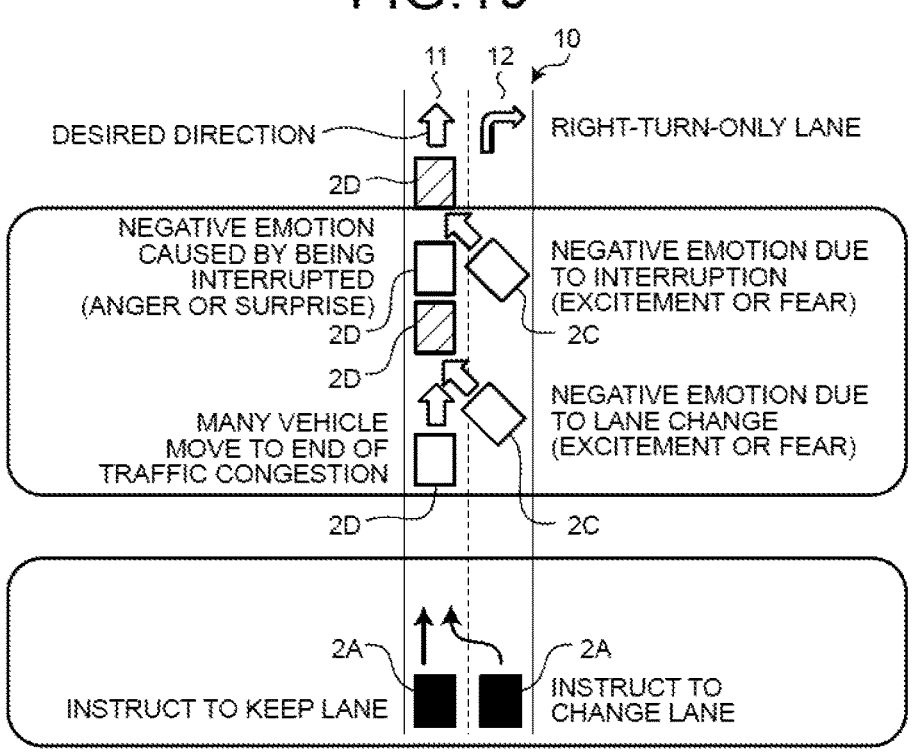
FIG. 10 is a schematic diagram for describing an example of a case where traffic congestion is generated.

In addition, in a case where traffic congestion is generated around the preceding vehicle 2C in which the negative emotion is detected, the control device 22 and the control device 32 may cause the notification device 23 of the own vehicle 2A to give notification of the instruction information instructing to move to an end of the traffic congestion. The instruction information may include information giving the instruction to move to the end of a traffic congestion including a plurality of vehicles 2D. For example, as illustrated in FIG. 10, in a situation in which the traffic congestion is generated in the first lane 11 before the intersection 14, it is assumed that there is a case where the second lane 12 is a right-turn-only lane and the own vehicle 2A desires to go straight through the intersection 14. In this case, when the own vehicle 2A is traveling on the first lane 11, the notification device 23 is caused to give notification of the instruction information to keep the lane. On the other hand, when the own vehicle 2A is traveling on the second lane 12, the notification device 23 is caused to give notification of the instruction information, which gives the instruction for the lane change, in advance.

Figure 11:
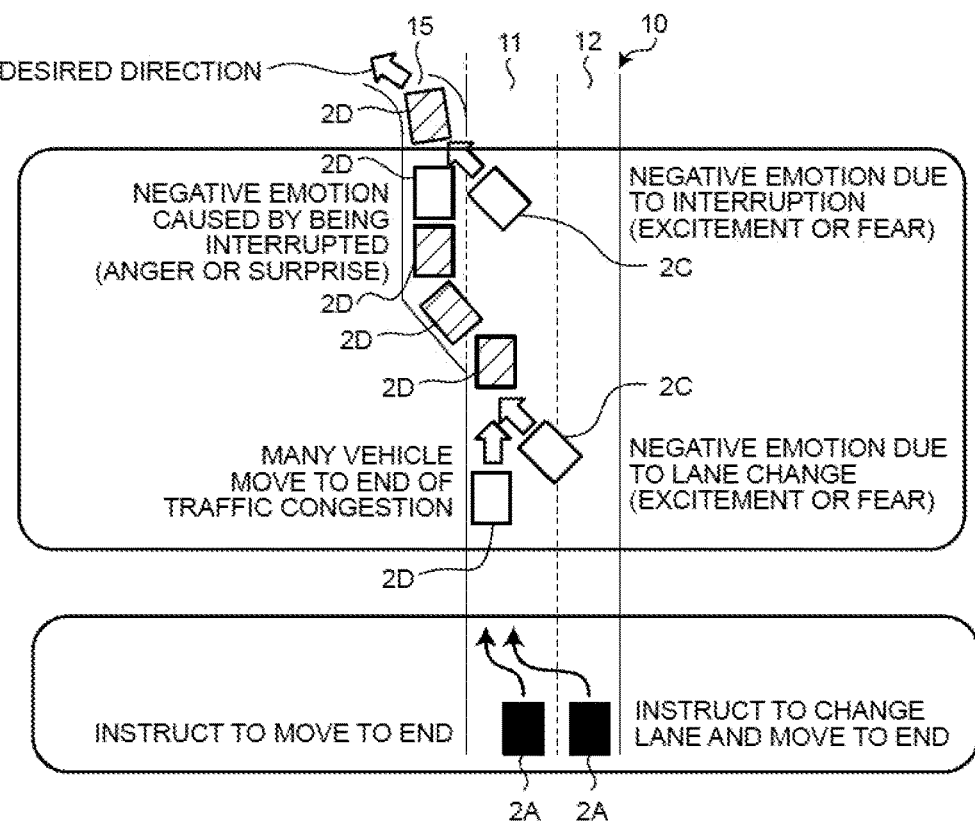
FIG. 11 is a schematic diagram for describing another example of a case where the traffic congestion is generated.

Furthermore, a point where the traffic congestion is generated is not limited to a point before the intersection 14. As points where the traffic congestion is generated, there are traffic congestion generated before an interchange exit of an expressway and traffic congestion generated before an entrance to a service area of an expressway. For example, as illustrated in FIG. 11, in a situation where traffic congestion is generated at an entrance of a service area of an expressway, in a case where the own vehicle 2A desires to move from the first lane 11 to a diverging entrance lane 15, the driver of the own vehicle 2A is notified of the instruction information to follow the vehicle 2D at the end of the traffic congestion. In a case of traveling on the first lane 11, the own vehicle 2A is instructed to move to the end. On the other hand, in a case of traveling on the second lane 12, the own vehicle 2A is instructed to change the lane to the first lane 11 and to move to the vehicle 2D at the end of the traffic congestion. Since the congestion situation of the vehicles 2 is different between weekdays and holidays on the expressway, timing of notifying the own vehicle 2A of the instruction information may be changed between weekdays and holidays. The notification timing for holidays may be set earlier than the notification timing for weekdays.

In the present disclosure, when a vehicle travels in a section including a plurality of lanes, the vehicle can travel on an appropriate lane in advance according to a situation on the lane.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   a control unit that controls a vehicle, wherein
   the control unit is configured to:
   control the vehicle to travel in a section including a plurality of lanes, determine driving information including: information that a preceding vehicle on a same lane as the vehicle requests a lane change, information indicative of a direction of the lane change, information indicative of a heart rate of a driver of the preceding vehicle, and information indicative of a vehicle speed of the preceding vehicle, detect a first negative emotion of the driver of the preceding vehicle in response to the heart rate of the driver of the preceding vehicle exceeding a predetermined value by using an estimation model generated by machine learning, detect a second negative emotion of the driver of the preceding vehicle based on the vehicle speed of the preceding vehicle, an inter-vehicle distance, and a steering angle of the preceding vehicle by using an estimation model generated by machine learning, transmit instruction information giving instruction for the lane change to the vehicle in a case where a predetermined number or more of negative emotions, including the first negative emotion and the second negative emotion, associated with the lane change are detected, determine, when the vehicle travels in the section including the plurality of lanes, whether a negative emotion associated with the lane change is detected in the preceding vehicle on the same lane as the vehicle, cause, in a case of determining that the negative emotion is detected, a notification device of the vehicle to give notification of the instruction information giving the instruction for the lane change, and transmit, in the case of determining that the negative emotion is detected, the instruction information giving the instruction for the lane change to a following vehicle on the same lane as the vehicle, wherein a control device of the following vehicle causes, in a case of receiving the instruction information, a notification device of the following vehicle to give notification of the instruction information.

2. The control device according to claim 1, wherein in a case where traffic congestion is generated around the preceding vehicle, the control unit causes the notification device to give notification of the instruction information instructing to move to an end of the traffic congestion.

3. The control device according to claim 1, wherein when causing the notification device to give notification of the instruction information giving the instruction for the lane change, the control unit causes notification of the instruction information giving the instruction for the lane change in a same direction as the direction in which the preceding vehicle requests the lane change.

* * * * *